US008690405B2

(12) United States Patent
Sekiguchi

(10) Patent No.: US 8,690,405 B2
(45) Date of Patent: Apr. 8, 2014

(54) VEHICLE LIGHTING UNIT

(71) Applicant: Stanley Electric Co., Ltd., Tokyo (JP)

(72) Inventor: Tatsuya Sekiguchi, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 13/750,091

(22) Filed: Jan. 25, 2013

(65) Prior Publication Data

US 2013/0188380 A1 Jul. 25, 2013

(30) Foreign Application Priority Data

Jan. 25, 2012 (JP) ................................ 2012-013197

(51) Int. Cl.
*B60Q 1/00* (2006.01)

(52) U.S. Cl.
USPC ............ 362/538; 362/539; 362/514; 362/517

(58) Field of Classification Search
USPC ................................ 362/517, 514, 538, 539
See application file for complete search history.

(56) References Cited

U.S. PATENT DOCUMENTS 7,387,416 B2 * 6/2008 Tsukamoto et al. .......... 362/518
7,654,714 B2 * 2/2010 Mochizuki et al. .......... 362/539
7,993,043 B2 * 8/2011 Sazuka et al. ................ 362/509
2005/0068787 A1 3/2005 Ishida
2007/0086202 A1 4/2007 Tsukamoto et al.

FOREIGN PATENT DOCUMENTS

JP 2005-108554 A 4/2005
JP 2007-109493 A 4/2007

* cited by examiner

*Primary Examiner* — Mary Ellen Bowman
(74) *Attorney, Agent, or Firm* — Kenealy Vaidya LLP

(57) ABSTRACT

A vehicle lighting unit is capable of improving the design freedom (such as that for forming a high-beam light distribution pattern) and to allow an observer to visually recognize the employed projection lens even when including a plurality of lens portions (including a plurality of rear-side focal points) as a single lens with high aesthetic feature.

18 Claims, 8 Drawing Sheets

VEHICLE LIGHTING UNIT

This application claims the priority benefit under 35 U.S.C. §119 of Japanese Patent Application No. 2012-013197 filed on Jan. 25, 2012, which is hereby incorporated in its entirety by reference.

TECHNICAL FIELD

The presently disclosed subject matter relates to vehicle lighting units, and in particular, to a vehicle lighting unit for use in a vehicle headlamp, or the like.

BACKGROUND ART

Conventional vehicle headlamps may include upper and lower optical units each utilizing a semiconductor light emitting device, such as those disclosed in Japanese Patent Application Laid-Open No. 2005-108554 (JP4044024B or U.S. Patent Publication No. 2005/0068787A1 corresponding thereto) and Japanese Patent Application Laid-Open No. 2007-109493 (JP4615417B or U.S. Patent Publication No. 2007/0086202A1 corresponding thereto).

FIG. 1 is a vertical cross-sectional view of a conventional vehicle headlamp 200 described in Japanese Patent Application Laid-Open No. 2005-108554.

As shown in the drawing, the vehicle headlamp 200 can have an optical axis AX extending in the front-to-rear direction and include a projection lens 210 disposed on the optical axis AX and having a rear-side focal point F, a first optical unit 220 disposed behind the projection lens 210 and facing upward, a second optical unit 230 disposed behind the projection lens 210 and facing downward, and a shade 240 disposed between the upper and lower optical units 220 and 230. The first optical unit 220 can include a semiconductor light emitting device 221 and a reflecting surface 222 while the second optical unit 230 can include a semiconductor light emitting device 231 and a reflecting surface 232.

In the vehicle headlamp 200 described in Japanese Patent Application Laid-Open No. 2005-108554 with the above configuration, the light provided by the second optical unit 230 (or the semiconductor light emitting device 231) can be converged at or near the rear-side focal point F of the projection lens 210 while a part thereof is shaded by the shade 240. The light passing through the projection lens 210 can be projected forward to form a high-beam light distribution pattern in the illumination direction thereof.

FIG. 2 is a vertical cross-sectional view of a vehicle headlamp 300 described in Japanese Patent Application Laid-Open No. 2007-109493.

As shown in the drawing, the vehicle headlamp 300 can have an optical axis AX extending in the front-to-rear direction and include a projection lens 310 disposed on the optical axis AX, a first optical unit 320 disposed behind the projection lens 310 and facing upward, a second optical unit 330 disposed behind the projection lens 310 and facing downward, and a shade 340 disposed between the upper and lower optical units 320 and 330. The projection lens 310 can include a center lens portion 311 disposed on the optical axis AX and a peripheral lens portion 312 disposed below the center lens portion 311. The first optical unit 320 can include a semiconductor light emitting device 321 and a reflecting surface 322 while the second optical unit 330 can include a semiconductor light emitting device 331 and a reflecting surface 332.

In the vehicle headlamp 300 described in Japanese Patent Application Laid-Open No. 2007-109493 with the above configuration, the light provided by the second optical unit 330 (or the semiconductor light emitting device 331) can be converged at or near the rear-side focal point F of the peripheral lens portion 312 of the projection lens 310 while the light is not shaded by the shade 340. The light passing through the peripheral lens portion 312 of the projection lens 310 can be projected forward to form a high-beam light distribution pattern in the illumination direction thereof.

In the vehicle headlamp 200 described in Japanese Patent Application Laid-Open No. 2005-108554, the produced high-beam light distribution pattern can include only the upper part of the projected light due to the lower part of the light shielded by the shade 240. Therefore, the vehicle headlamp 200 can form a high-beam light distribution pattern with insufficient luminous intensity, meaning that the high-beam light distribution pattern is formed with less design freedom.

In the vehicle headlamp 300 described in Japanese Patent Application Laid-Open No. 2007-109493, the produced high-beam light distribution can include the light without being shielded by the shade 340. However, as the projection lens 310 has a front surface 310a with a step A formed between the center lens portion 311 having a front surface 311a and the peripheral lens portion 312 having a front surface 312a, the resulting lens surface is a discontinuous lens surface. This prevents an observer from visually recognize the projection lens 310 as a single lens with less aesthetic features.

SUMMARY

The presently disclosed subject matter was devised in view of these and other problems and features and in view of the conventional art. According to an aspect of the presently disclosed subject matter, a vehicle lighting unit can be configured to improve design freedom (such as that for forming a high-beam light distribution pattern) and to allow an observer to visually recognize the employed projection lens even including a plurality of lens portions (including a plurality of rear-side focal points) as a single lens with high aesthetic feature.

According to another aspect of the presently disclosed subject matter, a vehicle lighting unit can have at least a first optical axis and a second optical axis extending in a front-to-rear direction of a vehicle body, and can include: a projection lens including a first lens portion disposed on the first optical axis and having a first front lens surface and a first rear lens surface, and a rear-side focal point, and a second lens portion disposed at least on one of right side and left side of the first lens portion and on the second optical axis and having a second front lens surface and a second rear lens surface, and a rear-side focal point; a first optical unit disposed behind the first lens portion; and a second optical unit disposed behind the second lens portion. In the vehicle lighting unit, the first front lens surface and the second front lens surface can be formed as a single continuous convex lens surface. The first optical unit can include: a first light source disposed behind the rear-side focal point of the first lens portion and near the first optical axis and emitting light upward; a first reflecting surface configured to reflect light emitted upward from the first light source so as to converge the reflected light at or near the rear-side focal point of the first lens portion and cause the light to pass through the first lens portion, thereby forming a low-beam light distribution pattern of projected light in an illumination direction; and a first shade disposed at or near the rear-focal point of the first lens portion. The second optical unit can be configured to provide light that can pass through the second lens portion to form a prescribed light distribution pattern in the illumination direction.

The vehicle lighting unit with the above configuration made in accordance with principles of the presently disclosed subject matter does not include vertically arranged optical units as in the vehicle headlamp disclosed in Japanese Patent Application Laid-Open No. 2005-108554, but can include the first lens portion behind which the first optical unit is disposed and the second lens portion disposed at least on one of right side and left side of the first lens portion and behind which the second optical unit is disposed. Namely, it can include the first optical unit at the center and the second optical unit at least on one of right side and left side of the first optical unit. Therefore, the light emitted from the second optical unit can be prevented from being shielded by a shade or the like forming the first optical unit. Accordingly, the vehicle lighting unit with the above configuration is capable of improving the design freedom (such as that for forming a predetermined light distribution pattern with the light emitted from the second optical unit), meaning that, for example, the high-beam light distribution pattern can have sufficient illuminance to serve as a high-beam light distribution pattern with improved far-distance visibility.

The vehicle lighting unit with the above configuration made in accordance with principles of the presently disclosed subject matter does not include such a discontinuous lens surface with a step as in the vehicle headlamp disclosed in Japanese Patent Application Laid-Open No. 2007-109493, but can include the single continuous convex lens with a smooth continuous front surface even including the first front lens surface of the first lens portion at the center and the second front lens surface of the second lens portion on the right side and/or left side of the first lens portion. This single convex lens surface can allow an observer to visually recognize the employed projection lens even including a plurality of lens portions (including a plurality of rear-side focal points) as a single lens with high aesthetic feature.

In the vehicle lighting unit with the above configuration, the second optical unit can include: a second light source disposed behind the rear-side focal point of the second lens portion and near the second optical axis and emitting light downward; and a second reflecting surface configured to reflect light emitted downward from the second light source so as to converge the reflected light at or near the rear-side focal point of the second lens portion and cause the light to pass through the second lens portion, thereby forming the prescribed light distribution pattern of projected light in the illumination direction.

With this configuration, the second optical unit can function as a projector type lighting unit.

Alternatively, the second optical unit can include: a third light source disposed behind the rear-side focal point of the second lens portion and emitting light that is allowed to pass through the second lens portion, thereby forming the prescribed light distribution pattern of projected light in the illumination direction.

With this configuration, the second optical unit can function as a direct projector type lighting unit.

In the vehicle lighting unit with the above configuration, the prescribed light distribution pattern can be a high-beam light distribution pattern.

With this configuration, the second optical unit can form a high-beam light distribution pattern.

According to still another aspect of the presently disclosed subject matter, a vehicle lighting unit can have at least a center optical axis, a left optical axis, and a right optical axis extending in a front-to-rear direction of a vehicle body, and can include: a projection lens including a center lens portion disposed on the center optical axis and having a center front lens surface and a center rear lens surface, and a rear-side focal point, a left lens portion disposed on a left side of the center lens portion and on the left optical axis and having a left front lens surface and a left rear lens surface, and a rear-side focal point, and a right lens portion disposed on a right side of the center lens portion and on the right optical axis and having a right front lens surface and a right rear lens surface, and a rear-side focal point; a center optical unit disposed behind the center lens portion; a left optical unit disposed behind the left lens portion; and a right optical unit disposed behind the right lens portion. In the vehicle lighting unit, the center front lens surface, the left front lens surface, and the right front lens surface can be formed as a single continuous convex lens surface without any step. The center optical unit can include: a center light source disposed behind the center rear-side focal point of the center lens portion and near the center optical axis and emitting light upward; a center reflecting surface configured to reflect light emitted upward from the center light source so as to converge the reflected light at or near the center rear-side focal point of the center lens portion and cause the light to pass through the center lens portion, thereby forming a low-beam light distribution pattern of projected light in an illumination direction; and a center shade disposed at or near the center rear-focal point of the center lens portion. The left optical unit can be configured to provide light that can pass through the left lens portion to form a first prescribed light distribution pattern in the illumination direction. The right optical unit can be configured to provide light that can pass through the right lens portion to form a second prescribed light distribution pattern in the illumination direction.

The vehicle lighting unit with the above configuration made in accordance with principles of the presently disclosed subject matter does not include vertically arranged optical units as in the vehicle headlamp disclosed in Japanese Patent Application Laid-Open No. 2005-108554, but can include the center optical unit and the right and left optical units on both sides of the center optical unit. Therefore, the light emitted from the left and right optical units can be prevented from being shielded by a shade or the like forming the center optical unit. Accordingly, the vehicle lighting unit with the above configuration is capable of improving the design freedom (such as that for forming respective predetermined light distribution patterns with the light emitted from the left and right optical units), meaning that, for example, the predetermined light distribution patterns can have sufficient illuminance to serve as a high-beam light distribution pattern with improved far-distance visibility.

The vehicle lighting unit with the above configuration made in accordance with principles of the presently disclosed subject matter does not include such a discontinuous lens surface with a step as in the vehicle headlamp disclosed in Japanese Patent Application Laid-Open No. 2007-109493, but can include the single continuous convex lens with a smooth continuous front surface even including the center front lens surface of the center lens portion, the left front lens surface of the left lens portion, and the right front lens surface of the right lens portion. This single convex lens surface can allow an observer to visually recognize the employed projection lens even including a plurality of lens portions (including a plurality of rear-side focal points) as a single lens with high aesthetic feature.

In the vehicle lighting unit with the above configuration, the left optical unit can include: a left light source disposed behind the rear-side focal point of the left lens portion and near the left optical axis and emitting light downward; and a left reflecting surface configured to reflect light emitted downward from the left light source so as to converge the reflected light at or near the rear-side focal point of the left lens portion and cause the light to pass through the left lens portion, thereby forming the first prescribed light distribution pattern of projected light in the illumination direction. Further, the right optical unit can include: a right light source disposed behind the rear-side focal point of the right lens portion and near the right optical axis and emitting light downward; and a right reflecting surface configured to reflect light emitted downward from the right light source so as to converge the reflected light at or near the rear-side focal point of the right lens portion and cause the light to pass through the right lens portion, thereby forming the second prescribed light distribution pattern of projected light in the illumination direction.

With this configuration, the left and right optical units can function as a projector type lighting unit.

Alternatively, the left optical unit can include: a left light source disposed behind the rear-side focal point of the left lens portion and emitting light that is allowed to pass through the left lens portion, thereby forming the first prescribed light distribution pattern of projected light in the illumination direction, and the right optical unit can include: a right light source disposed behind the rear-side focal point of the right lens portion and emitting light that is allowed to pass through the right lens portion, thereby forming the second prescribed light distribution pattern of projected light in the illumination direction.

With this configuration, the left and right optical units can function as a direct projector type lighting unit.

In the vehicle lighting unit with the above configuration, the first and second predetermined light distribution patterns can be a high-beam light distribution pattern.

With this configuration, the left and right optical units can form a high-beam light distribution pattern.

According to the disclosed embodiments, the light source can be a semiconductor light emitting device.

According to the aspect of the presently disclosed subject matter, there is provided a vehicle lighting unit capable of improving design freedom (such as that for forming a high-beam light distribution pattern) and allowing an observer to visually recognize the employed projection lens even including a plurality of lens portions (including a plurality of rear-side focal points) as a single lens with high aesthetic feature.

According to yet another aspect of the disclosed subject matter, a vehicle lighting unit can include a projection lens including a first lens portion disposed on a first optical axis and having a front lens surface and a rear lens surface, and a rear-side focal point, and a second lens portion disposed at least on one of right side and left side of the first lens portion and on a second optical axis and having a front lens surface and a rear lens surface, and a rear-side focal point. A first optical unit can be disposed behind the first lens portion. A second optical unit can be disposed behind the second lens portion. The front lens surfaces of the first and second lens portions can be formed as a single continuous convex lens surface without any step. The first optical unit can include a first light source disposed behind the rear-side focal point of the first lens portion and near the first optical axis and emitting light upward, a first reflecting surface configured to reflect light emitted upward from the first light source so as to converge the reflected light at or near the rear-side focal point of the first lens portion and cause the light to pass through the first lens portion, thereby forming a low-beam light distribution pattern of projected light in an illumination direction, and a first shade disposed at or near (i.e., substantially at) the rear-focal point of the first lens portion. The second optical unit can be configured to provide light that can pass through the second lens portion to form a prescribed light distribution pattern in the illumination direction.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle lighting units of the presently disclosed subject matter with reference to the accompanying drawings in accordance with exemplary embodiments. Further, the directions of up, down (low), right, left, front, and rear (back), and the like are defined on the basis of the actual posture of a lighting unit or a headlamp installed on a vehicle body, unless otherwise specified.

A description will be given of a vehicle lighting unit 10 of a first exemplary embodiment with reference to the accompanying drawings.

Figure 1:
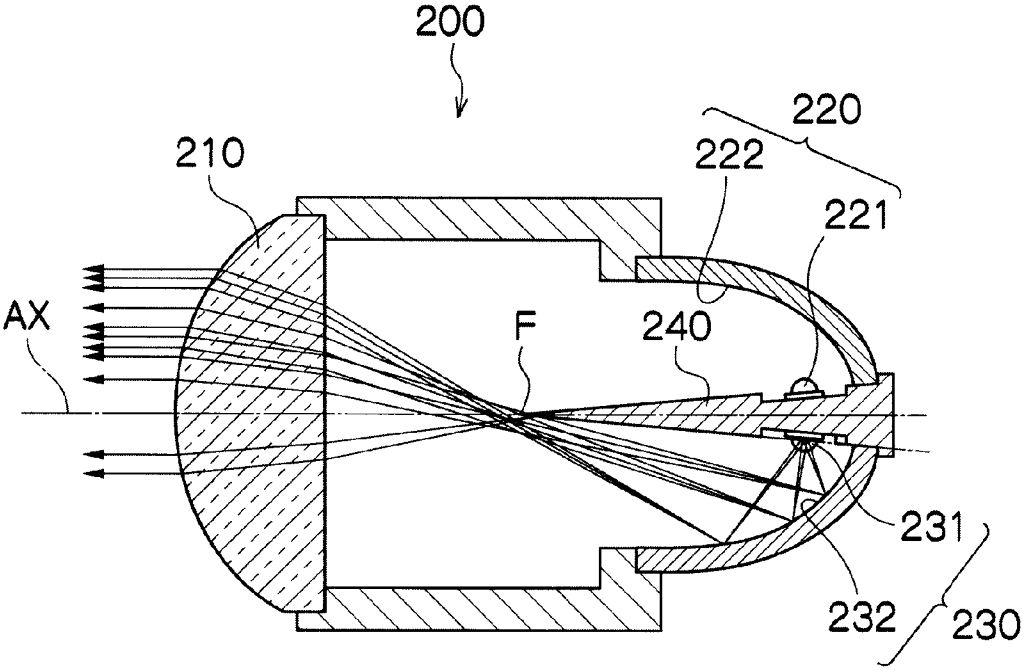
Fig. 1 Conventional Art
FIG. 1 is a vertical cross-sectional view of a conventional vehicle headlamp.
Figure 2:
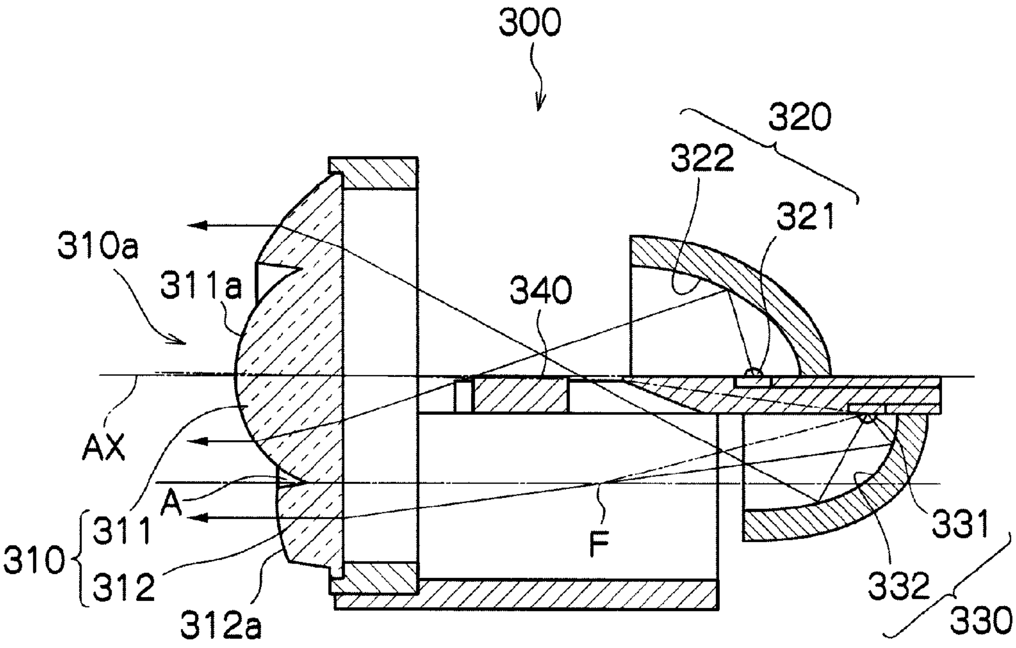
Fig. 2 Conventional Art
FIG. 2 is a vertical cross-sectional view of another conventional vehicle headlamp.
Figure 3:
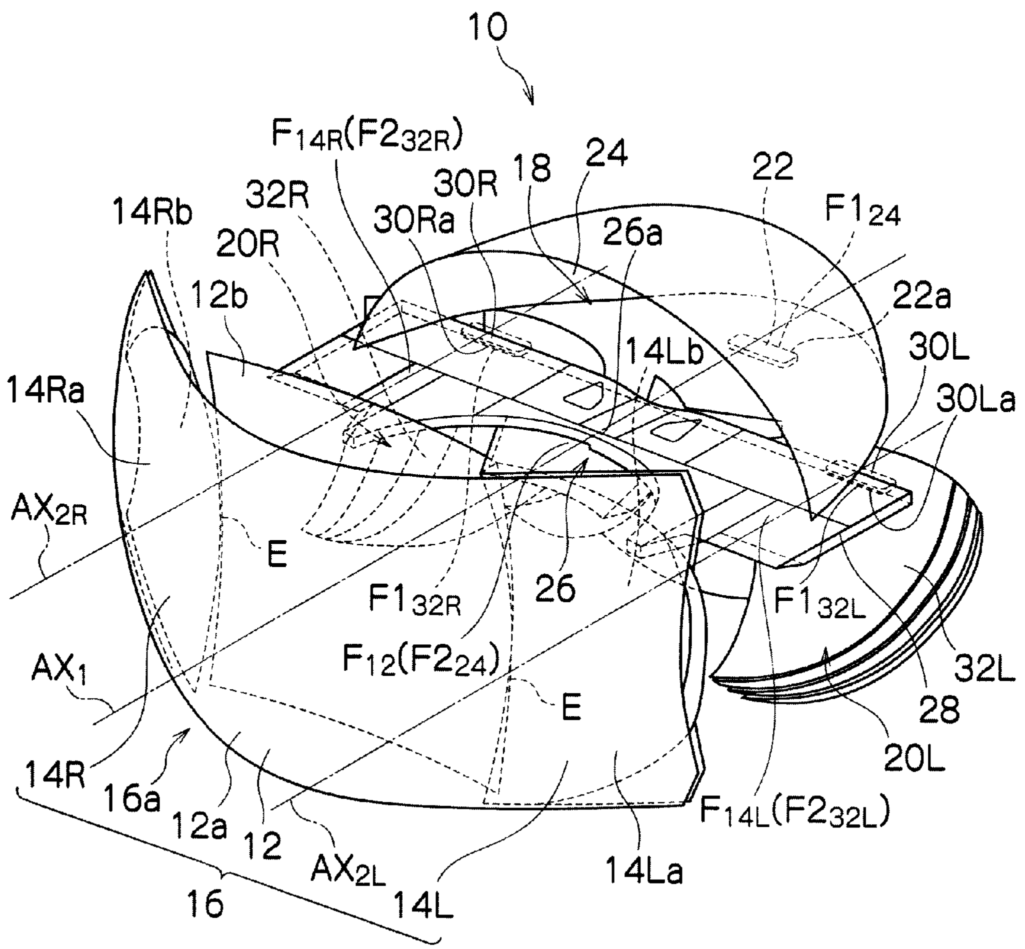
FIG. 3 is a perspective view showing a vehicle lighting unit according to a first exemplary embodiment made in accordance with principles of the presently disclosed subject matter.
Figure 4:
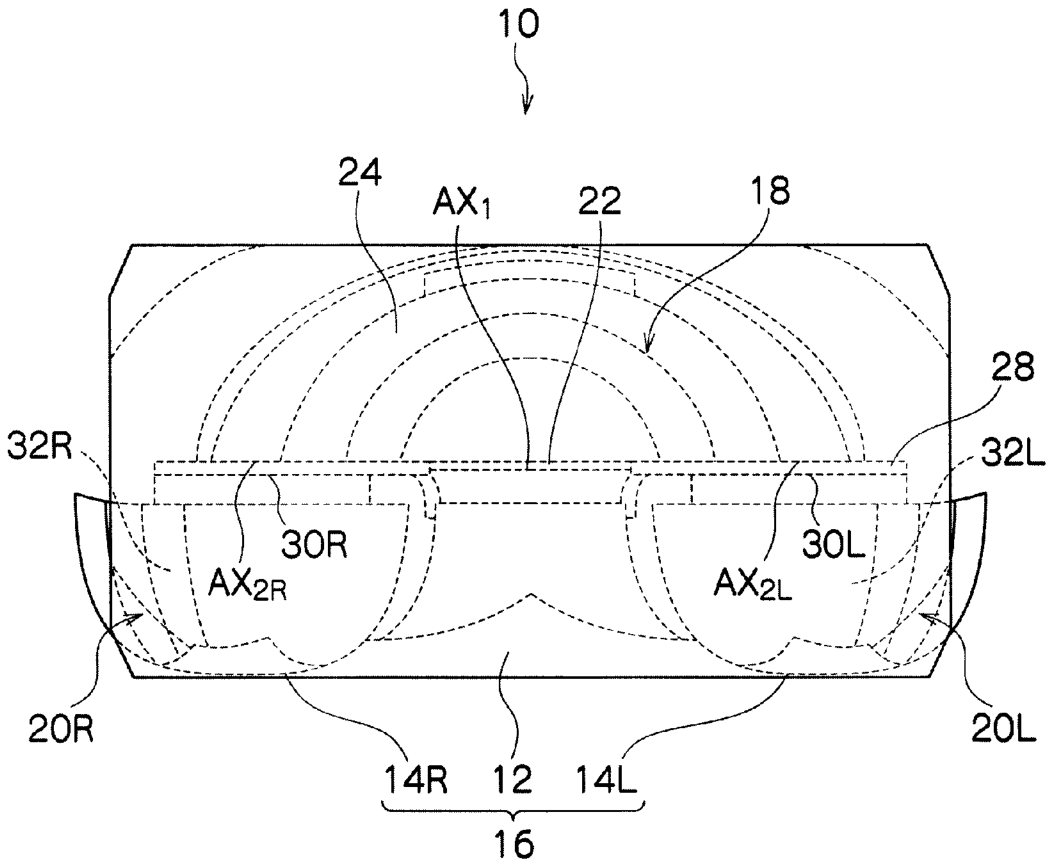
FIG. 4 is a front view of the vehicle lighting unit of FIG. 3.
Figure 5:
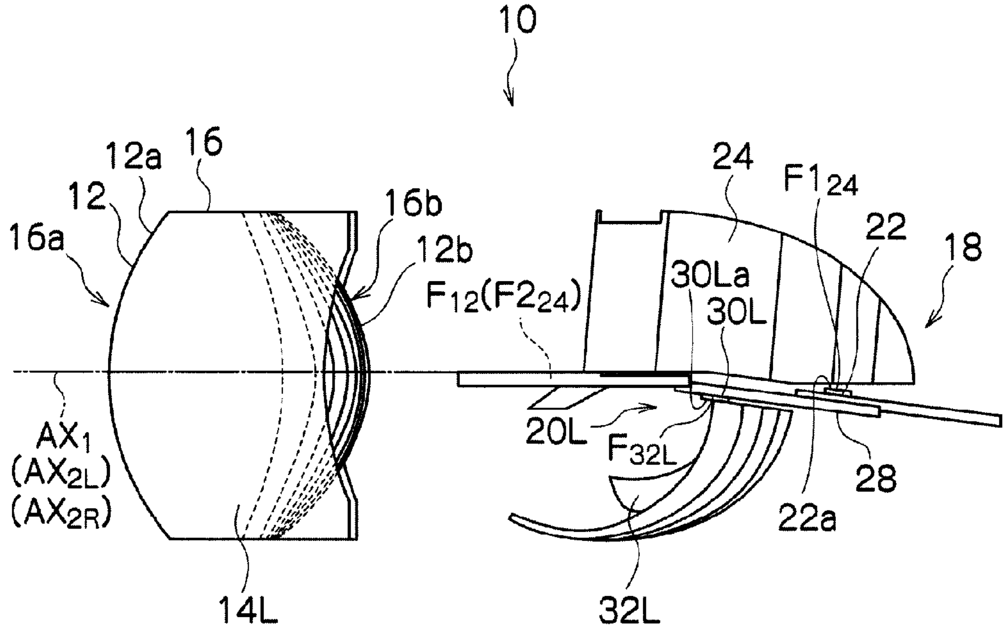
FIG. 5 is a side view of the vehicle lighting unit of FIG. 3.
Figure 6:
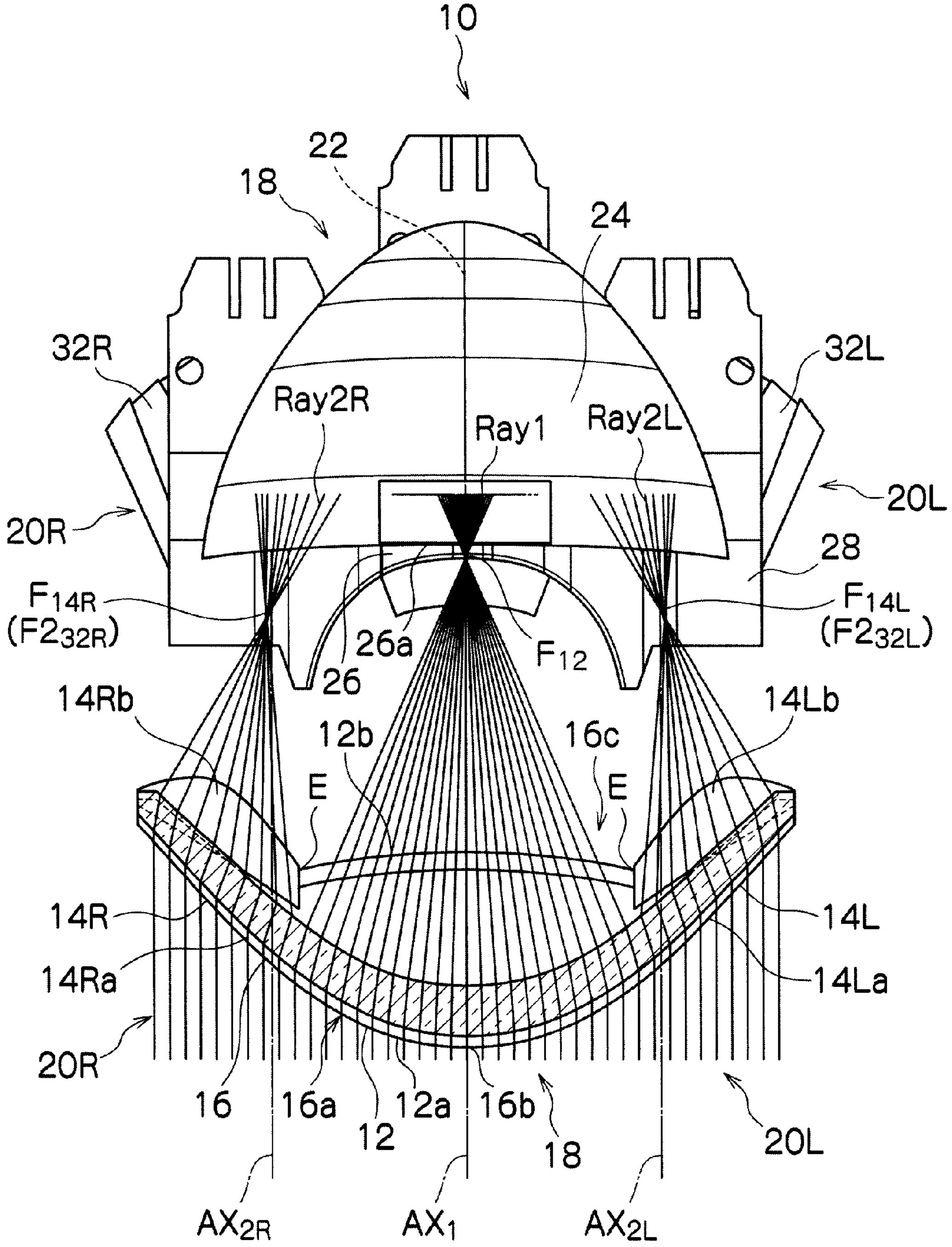
FIG. 6 is a top plan view of the vehicle lighting unit of FIG. 3.

FIG. 3 is a perspective view showing the vehicle lighting unit 10 according to the first exemplary embodiment made in accordance with the principles of the presently disclosed subject matter, and FIGS. 4, 5, and 6 are a front view, a side view and a top plan view of the vehicle lighting unit 10 of FIG. 3, respectively.

As shown in FIGS. 3 to 6, the vehicle lighting unit 10 of the present exemplary embodiment can be a projector type lighting unit capable of switching the emission of light with a low-beam light distribution pattern and that with a high-beam light distribution pattern. The vehicle lighting unit 10 can have at least a center optical axis $AX_1$, a left optical axis $AX_{2L}$, and a right optical axis $AX_{2R}$ extending in a front-to-rear direction of a vehicle body (not shown), and can include: a projection lens 16 including a center lens portion 12 disposed on the center optical axis $AX_1$, a left lens portion 14L disposed on the left side of the center lens portion 12 and on the left optical axis $AX_{2L}$, and a right lens portion 14R disposed on the right side of the center lens portion 12 and on the right optical axis $AX_{2R}$; a center optical unit 18 disposed behind the center lens portion 12; a left optical unit 20L disposed behind the left lens portion 14L; and a right optical unit 20R disposed behind the right lens portion 14R. The left optical axis $AX_{2L}$ and the right optical axis $AX_{2R}$ can be disposed in parallel with the center optical axis $AX_1$ on respective sides of center optical axis $AX_1$.

The projection lens 16 including the center, left and right lens portions 12, 14L, and 14R can be integrally formed by injecting a transparent resin such as an acrylic resin and a polycarbonate resin into a mold and cooling and solidifying the resin. The material of the projection lens 16 is not limited to transparent resins, but may be glass or a similar material. The projection lens 16 can be held by a not-shown lens holder fixed to a holding member 28.

As shown in FIG. 6, the center lens portion 12 can be configured to refract, toward the center optical axis $AX_1$, the light rays Ray1 emitted from the center semiconductor light emitting device 22 and reflected by a center reflecting surface 24 so as to collimate the light rays Ray1 with respect to the center optical axis $AX_1$, and can include a center front lens surface 12*a* and a center rear lens surface 12*b*.

The center front lens surface 12*a* can be a convex forward lens surface. The center rear lens surface 12*b* can be configured to refract, toward the center optical axis $AX_1$, the light rays Ray1 reflected by the center reflecting surface 24 and passing through the center lens portion 12 so as to collimate the light rays Ray1 with respect to the center optical axis $AX_1$, thereby exiting the collimated light rays Ray1 from the center lens portion 12 through the center front lens surface 12*a*.

The left lens portion 14L can be configured to refract, toward the left optical axis $AX_{2L}$, the light rays Ray2L emitted from the left semiconductor light emitting device 30L and reflected by a left reflecting surface 32L so as to collimate the light rays Ray2L with respect to the left optical axis $AX_{2L}$, and can include a left front lens surface 14La and a left rear lens surface 14Lb.

The left front lens surface 14La is a lens surface smoothly extending from the center lens surface 12*a* of the center lens portion 12 to the rear side without any step therebetween. The lens surface 14La may be convex forward. The left rear lens surface 14Lb can be configured to refract, toward the left optical axis $AX_{2L}$, the light rays Ray2L reflected by the left reflecting surface 32L and passing through the left lens portion 14L so as to collimate the light rays Ray2L with respect to the left optical axis $AX_{2L}$, thereby exiting the collimated light rays Ray2L from the left lens portion 14L through the left front lens surface 14La.

The right lens portion 14R can be configured to refract, toward the right optical axis $AX_{2R}$, the light rays Ray2R emitted from the right semiconductor light emitting device 30R and reflected by a right reflecting surface 32R so as to collimate the light rays Ray2R with respect to the right optical axis $AX_{2R}$, and can include a right front lens surface 14Ra and a right rear lens surface 14Rb.

The right front lens surface 14Ra is a lens surface smoothly extending from the center lens surface 12*a* of the center lens portion 12 to the rear side without any step therebetween. For example, the lens surface can be described as smoothly extending between surface portions inasmuch as tangent lines attributed to immediately adjacent surfaces of the lens surface form angles with respect to each other that are not greater than 5 degrees. The lens surface 14Ra may be convex forward. The right rear lens surface 14Rb can be configured to refract, toward the right optical axis $AX_{2R}$, the light rays Ray2R reflected by the right reflecting surface 32R and passing through the right lens portion 14R so as to collimate the light rays Ray2R with respect to the right optical axis $AX_{2R}$, thereby exiting the collimated light rays Ray2R from the right lens portion 14R through the right front lens surface 14Ra.

As described above, the front surface 16*a* of the projection lens 16 is not formed as a discontinuous lens surface with a step like that described in Japanese Patent Application Laid-Open No. 2005-108554, but can be formed as a single convex lens surface including the center front lens surface 12*a* of the center lens portion 12 and the respective left and right lens surfaces 14La and 14Ra of the left and right lens portions 14L and 14R and being smoothly continuous without any step. For example, as shown in FIG. 6, the front surface 16*a* of the projection lens 16 can be a smooth convex lens surface (for example, a free curved surface) which is convex forward and symmetric in the horizontal direction with respect to a vertical plane including the center optical axis $AX_1$ with a forward-most portion 16*b* on the center optical axis $AX_1$. Therefore, the outer appearance of the single convex lens surface, or the front surface 16*a* of the projection lens 16, can allow the projection lens 16 to be visually observed as a single convex lens although the projection lens 16 is configured to include the plurality of lens portions 12, 14L and 14R (meaning that the lens can include a plurality of rear-side focal points $F_{12}$, $F_{14L}$, and $F_{14R}$ arranged in the horizontal direction). See FIGS. 3 and 6.

A description will next be given of the shape of the rear surface 16*b* of the projection lens 16.

The rear surface 16*b* of the projection lens 16 can be composed of three lens surfaces (including the center rear lens surface 12*b* of the center lens portion 12, and the respective left and right rear lens surfaces 14Lb and 14Rb of the left and right lens portions 14L and 14R) and the borders between them can be formed as curved surfaces. Then, when the light rays Ray1, Rya2L, and Ray3L reflected by the respective reflecting surfaces 24, 32L, and 32R impinge on the borders (curved surfaces), they may become glare light by refraction.

In the present exemplary embodiment, to cope with this problem, the borders between these three lens surfaces constituting the rear surface 16*b* of the projection lens 16 (including the center rear lens surface 12*b* of the center lens portion 12, and the respective left and right rear lens surfaces 14Lb and 14Rb of the left and right lens portions 14L and 14R) are not formed of curved surfaces, but can be formed as vertically extending edges E (steps E) as shown in FIGS. 3 and 6.

The center optical unit 18 can be configured to be a projector type optical unit for forming a low-beam light distribution pattern, and to include a center semiconductor light emitting device 22, the center reflecting surface 24, a shade 26, and the like. The holding member 28 can hold the center semiconductor light emitting device 22, the center reflecting surface 24, and the shade 26.

The center semiconductor light emitting device 22 can be a semiconductor light emitting device such as a light emitting diode (LED) or a laser diode (LD).

In the present exemplary embodiment, the center semiconductor light emitting device 22 can be formed of four white LED light sources each having an LED chip (for example, blue emission LED chip) and a wavelength conversion member (for example, yellow phosphor of YAG, or the like) covering the LED chip with a square emission surface 22*a* having a 1-mm side. Here, part of light emitted from the LED chip, such as blue light, can excite the phosphor, and the excited phosphor can emit yellow light. The original blue light passing through the wavelength conversion member can be mixed with the wavelength converted yellow light to generate white light. Off course, the number of the white LED light sources is not limited to four, but may be 1 to 3, or 5 or more as long as the required specification as a vehicle headlamp is satisfied.

The center semiconductor light emitting device 22 can be disposed on top of a substrate fixed on the holding member 28 behind the focal point $F_{12}$ of the center lens portion 12 and on or near (i.e., substantially at) the center optical axis $AX_1$. More specifically, the four white LED light sources of the center semiconductor light emitting device 22 can be mounted on the substrate so that the respective light emission surfaces 22*a* face upward or upward and diagonally rearward (see FIG. 5), so that the respective one sides of the four white LED light sources are aligned with a horizontal line orthogonal to the center optical axis $AX_1$, and so that the four white LED light sources are arranged in line in the width direction of a vehicle body (along the horizontal line) at predetermined intervals. In this manner, the four light emission surfaces with 1 mm square can constitute an elongated rectangular light emission surface in the vehicle body width direction. Thus, the center optical axis $AX_1$ can pass through approximately the center of the center semiconductor light emitting device 22 (or of the four white LED light sources) with respect to the vehicle body width direction.

The center reflecting surface 24 can be formed of a revolved ellipsoid or similar free curved surface having a first focal point $F1_{24}$ disposed at or near (i.e., substantially at) the center semiconductor light emitting device 22 and a second focal point $F2_{24}$ disposed at or near (i.e., substantially at) the rear focal point $F_{12}$ of the center lens portion 12. The center reflecting surface 24 can be configured to be disposed above the center semiconductor light emitting device 22 to extend from the rear side of the device 22 to the projection lens side so as to cover the area above the center semiconductor light emitting device 22.

Figure 7A:
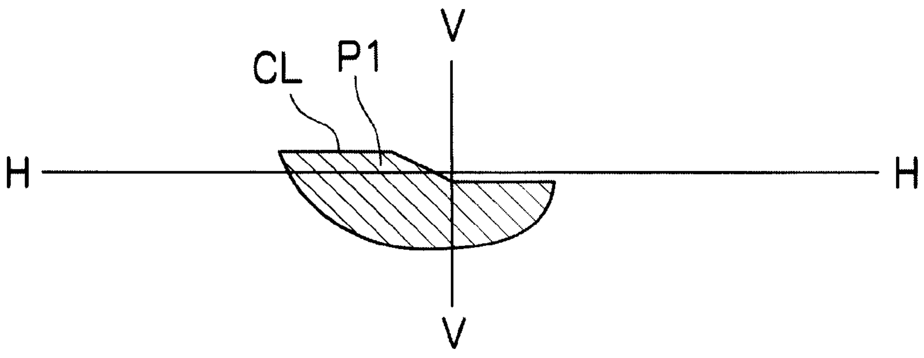
FIG. 7A is an exemplary low-beam light distribution pattern (P1) formed by a center optical unit.

The center reflecting surface 24 can reflect light rays emitted upward from the center semiconductor light emitting device 22 to converge the reflected light rays Ray1 at the rear focal point $F_{12}$ of the center lens portion 12. The converged light rays Ray1 can pass through the center lens portion 12 while being collimated, and be projected forward. The projected light rays can form a low-beam light distribution pattern P1 as shown in FIG. 7A when the light rays are assumed to be projected on a virtual vertical screen disposed in front of the vehicle body about 25 m apart. Thus, FIG. 7A is an exemplary low-beam light distribution pattern P1 formed by the center optical unit 18.

The shade 26 can include a mirror surface 26*a* extending from the rear focal point F12 of the center lens portion 12 toward the center semiconductor light emitting device 22. The shade 26 can include a front edge concavely curved along the rear focal point plane of the center lens portion 12. Part of the light rays Ray1 can impinge on the mirror surface 26*a* to be reflected upward and then, can enter the center lens portion 12 to be refracted and directed to a road surface. Specifically, the light rays impinging on the mirror surface 26*a* can be assumed to be controlled so as to be folded back along a cut-off line and overlaid on the light distribution pattern below the cut-off line. In this manner, the cut-off line CL can be defined by the shade 26 (the front edge of the shade 26) at the upper edge of the low-beam light distribution pattern P1 as observed on the virtual vertical screen in FIG. 7A.

With the above-described configuration, the center optical unit 18 can form the low-beam light distribution pattern P1 including the cut-off line CL. More specifically, when the center semiconductor light emitting device 22 is turned on, the light rays Ray1 emitted from the center semiconductor light emitting device 22 can impinge on and be reflected by the center reflecting surface 24, and converged at or near the rear focal point $F_{12}$ of the center lens portion 12, and then travel through the center lens portion 12 while being collimated by the same. The projected light rays can form the low-beam light distribution pattern P1 including the cut-off line CL defined by the front edge of the shade 26 as observed on the virtual vertical screen in front of the vehicle body. See FIG. 7A.

As the light rays Ray1 from the center semiconductor light emitting device 22 can be collimated with respect to the center optical axis $AX_1$ while passing through the center lens portion 12 (see FIG. 6), the low-beam light distribution pattern P1 can become a pattern with high concentration (just like spot light) and thereby high illuminance.

The left optical unit 20L can be configured to be a projector type optical unit for forming a high-beam light distribution pattern, and to include a left semiconductor light emitting device 30L, a left reflecting surface 32L, and the like. The holding member 28 can hold the left semiconductor light emitting device 30L and the left reflecting surface 32L.

The left semiconductor light emitting device 30L can be a semiconductor light emitting device such as a light emitting diode (LED) or a laser diode (LD).

In the present exemplary embodiment, the left semiconductor light emitting device 30L can be formed of four white LED light sources similar to those of the center semiconductor light emitting device 22.

The left semiconductor light emitting device 30L can be disposed on top of a substrate fixed on the holding member 28 behind the focal point $F_{14L}$ of the left lens portion 14L and on or near the left optical axis $AX_{2L}$. More specifically, the four white LED light sources of the left semiconductor light emitting device 30L can be mounted on the substrate so that the respective light emission surfaces 30La face downward or downward and diagonally forward (see FIG. 5), so that the respective one sides of the four white LED light sources are aligned with a horizontal line orthogonal to the left optical axis $AX_{2L}$, and so that the four white LED light sources are arranged in line in the width direction of a vehicle body (along the horizontal line) at predetermined intervals. In this manner, the four light emission surfaces with 1 mm square can constitute an elongated rectangular light emission surface in the vehicle body width direction. Thus, the left optical axis $AX_{2L}$ can pass through approximately the center of the left semiconductor light emitting device 30L (or of the four white LED light sources) with respect to the vehicle body width direction.

The left reflecting surface 32L can be formed of a revolved ellipsoid or similar free curved surface having a first focal point $F1_{32L}$ disposed at or near the left semiconductor light emitting device 30L and a second focal point $F2_{32L}$ disposed at or near the rear focal point $F_{14L}$ of the left lens portion 14L. The left reflecting surface 32L can be configured to be disposed below the left semiconductor light emitting device 30L to extend from the rear side of the device 30L to the projection lens side so as to cover the area below the left semiconductor light emitting device 30L.

Figure 7B:
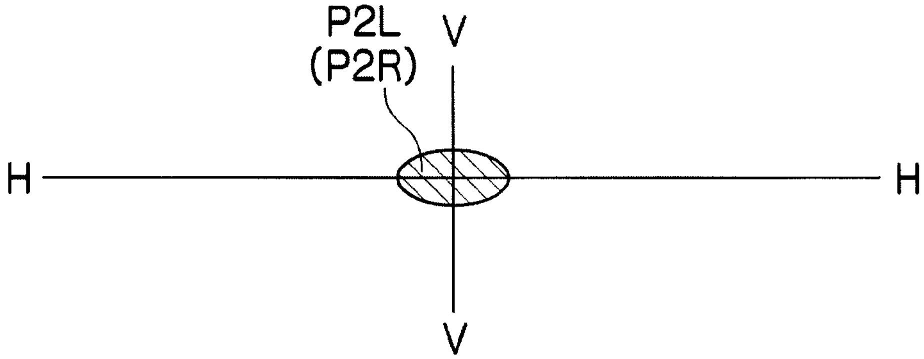
FIG. 7B is an exemplary high-beam light distribution pattern (P2L, P2R) formed by a left optical unit and a right optical unit.

The left reflecting surface 32L can reflect light rays emitted downward from the left semiconductor light emitting device 30L to converge the reflected light rays Ray2L at the rear focal point $F_{14L}$ of the left lens portion 14L. The converged light rays Ray2L can pass through the left lens portion 14L while being collimated, and be projected forward. The projected light rays can form a high-beam light distribution pattern P2L as shown in FIG. 7B when the light rays are assumed to be projected on the virtual vertical screen disposed in front of the vehicle body about 25 m apart. FIG. 7B is an exemplary high-beam light distribution pattern P2L formed by the left optical unit 20L.

With the above-described configuration, the left optical unit 20L can form the high-beam light distribution pattern P2L. More specifically, when the left semiconductor light emitting device 30L is turned on, the light rays Ray2L emitted from the left semiconductor light emitting device 30L can impinge on and be reflected by the left reflecting surface 32L, and converged at or near the rear focal point $F_{14L}$ of the left lens portion 14L, and then travel through the left lens portion 14L while being collimated by the same. The projected light rays can form the high-beam light distribution pattern P2L as observed on the virtual vertical screen in front of the vehicle body. See FIG. 7B.

As the light rays Ray2L from the left semiconductor light emitting device 30L can be collimated with respect to the left optical axis $AX_{2L}$ while passing through the left lens portion 14L (see FIG. 6), the high-beam light distribution pattern P2L can become a pattern with high concentration (just like spot light) and thereby high illuminance.

As described above, the present exemplary embodiment can be configured so that the optical units are not disposed vertically as in the conventional vehicle headlamp, but instead the left optical unit 20L can be disposed on the left side of the center optical unit 18. Accordingly, the light rays projected from the left optical unit 20L cannot be hindered by members like a shade of an adjacent optical unit. Therefore, the vehicle lighting unit with the above configuration is capable of improving the design freedom for forming a predetermined light distribution pattern, or the high-beam light distribution pattern P2L in the present exemplary embodiment, with the light emitted from the left optical unit 20L, meaning that the high-beam light distribution pattern P2L can have sufficient illuminance to serve as a high-beam light distribution pattern with improved far-distance visibility.

The right optical unit 20R can be configured to be a projector type optical unit for forming a high-beam light distribution pattern, and to include a right semiconductor light emitting device 30R, a right reflecting surface 32R, and the like. The holding member 28 can hold the right semiconductor light emitting device 30R and the right reflecting surface 32R.

The right semiconductor light emitting device 30*r* can be a semiconductor light emitting device such as a light emitting diode (LED) or a laser diode (LD).

In the present exemplary embodiment, the right semiconductor light emitting device 30R can be formed of four white LED light sources similar to those of the center semiconductor light emitting device 22.

The right semiconductor light emitting device 30R can be disposed on top of a substrate fixed on the holding member 28 behind the focal point $F_{14R}$ of the right lens portion 14R and on or near the right optical axis $AX_{2R}$. More specifically, the four white LED light sources of the right semiconductor light emitting device 30R can be mounted on the substrate so that the respective light emission surfaces 30Ra face downward or downward and diagonally forward, so that the respective one sides of the four white LED light sources are aligned with a horizontal line orthogonal to the right optical axis $AX_{2R}$, and so that the four white LED light sources are arranged in line in the width direction of a vehicle body (along the horizontal line) at predetermined intervals. In this manner, the four light emission surfaces with 1 mm square can constitute an elongated rectangular light emission surface in the vehicle body width direction. Thus, the right optical axis $AX_{2R}$ can pass through approximately the center of the right semiconductor light emitting device 30R (or of the four white LED light sources) with respect to the vehicle body width direction.

The right reflecting surface 32R can be formed of a revolved ellipsoid or similar free curved surface having a first focal point $F1_{32R}$ disposed at or near the right semiconductor light emitting device 30R and a second focal point $F2_{32R}$ disposed at or near the rear focal point $F_{14R}$ of the right lens portion 14R. The right reflecting surface 32R can be configured to be disposed below the right semiconductor light emitting device 30R to extend from the rear side of the device 30R to the projection lens side so as to cover the area below the right semiconductor light emitting device 30R.

The right reflecting surface 32R can reflect light rays emitted downward from the right semiconductor light emitting device 30R to converge the reflected light rays Ray2R at the rear focal point $F_{14R}$ of the right lens portion 14R. The converged light rays Ray2R can pass through the right lens portion 14R while being collimated, and be projected forward. The projected light rays can form a high-beam light distribution pattern P2R as shown in FIG. 7B when the light rays are assumed to be projected on the virtual vertical screen disposed in front of the vehicle body about 25 m apart. FIG. 7B is an exemplary high-beam light distribution pattern P2R formed by the right optical unit 20R.

With the above-described configuration, the right optical unit 20R can form the high-beam light distribution pattern P2R. More specifically, when the right semiconductor light emitting device 30R is turned on, the light rays Ray2R emitted from the right semiconductor light emitting device 30R can impinge on and be reflected by the right reflecting surface 32R, and converged at or near the rear focal point $F_{14R}$ of the right lens portion 14R, and then travel through the right lens portion 14R while being collimated by the same. The projected light rays can form the high-beam light distribution pattern P2R as observed on the virtual vertical screen in front of the vehicle body (See, for example, FIG. 7B).

As the light rays Ray2R from the right semiconductor light emitting device 30R can be collimated with respect to the right optical axis $AX_{2R}$ while passing through the right lens portion 14R (see FIG. 6), the high-beam light distribution pattern P2R can become a pattern with high concentration (just like spot light) and thereby high illuminance.

As described above, the present exemplary embodiment can be configured so that the optical units are not disposed vertically as in the conventional vehicle headlamp, but the right optical unit 20R can be disposed on the right side of the center optical unit 18. Accordingly, the light rays projected from the right optical unit 20R cannot be hindered by members like a shade of an adjacent optical unit. Therefore, the vehicle lighting unit with the above configuration is capable of improving the design freedom for forming a predetermined light distribution pattern, or the high-beam light distribution pattern P2R in the present exemplary embodiment, with the light emitted from the right optical unit 20R, meaning that the high-beam light distribution pattern P2R can have sufficient illuminance to serve as a high-beam light distribution pattern with improved far-distance visibility.

A description will now be given of lighting control of the vehicle lighting unit 10 with the above configuration (including the semiconductor light emitting devices 22, and 30L and 30R).

In the present exemplary embodiment, the respective semiconductor light emitting devices 22, and 30L and 30R are assumed to be electrically connected to a not-shown controller such as an ECU, to which also electrically connected is a not-shown switching device for switching between high beam and low beam.

First, when the switching device is changed to low beam side, the controller can supply the center semiconductor light emitting device 22 with a constant current to turn on the center semiconductor light emitting device 22. Upon turning on the center semiconductor light emitting device 22, the low-beam light distribution pattern P1 shown in FIG. 7A can be formed on a road as observed on the virtual vertical screen.

When the switching device is changed to high beam side, the controller can supply the left and right semiconductor light emitting devices 30L and 30R in addition to the center semiconductor light emitting device 22 with a constant current to turn on all the semiconductor light emitting devices 22, and 30L and 30R. Upon turning on all the semiconductor light emitting devices 22, and 30L and 30R, the high-beam synthesized pattern generated by overlaying the low-beam light distribution pattern P1 shown in FIG. 7A on the high-beam light distribution patterns P2L and P2R shown in FIG. 7B can be formed on a road as observed on the virtual vertical screen.

As described above, the present exemplary embodiment can be configured so that the optical units are not disposed vertically as in the conventional vehicle headlamp, but the left and right optical units 20L and 20R can be disposed on the left and right sides of the center optical unit 18, respectively. Accordingly, the light rays projected from the left and right optical units 20L and 20R cannot be hindered by some members like a shade of an adjacent optical unit. Therefore, the vehicle lighting unit 10 with the above configuration is capable of improving the design freedom for forming predetermined light distribution patterns, or the high-beam light distribution patterns P2L and P2R, with the light emitted from the left and right optical units 20L and 20R, meaning that the high-beam light distribution patterns P2L and P2R can have sufficient illuminance to serve as a high-beam light distribution pattern with improved far-distance visibility.

Furthermore, the front surface 16*a* of the projection lens 16 is not formed as a discontinuous lens surface with a step like that described in Japanese Patent Application Laid-Open No. 2005-108554, but can be formed as a single convex lens surface including the center front lens surface 12*a* of the center lens portion 12 and the respective left and right lens surfaces 14La and 14Ra of the left and right lens portions 14L and 14R and being smoothly continuous without any step (i.e. having a smooth continuous arc along an entire longitudinal axis of the front surface 16*a* of the projection lens 16). Therefore, the outer appearance of the single convex lens surface, or the front surface 16*a* of the projection lens 16, can allow the projection lens 16 to be visually observed as a single convex lens although the projection lens 16 is configured to include the plurality of lens portions 12, 14L and 14R (meaning that the lens can include a plurality of rear-side focal points $F_{12}$, $F_{14L}$, and $F_{14R}$ arranged in the horizontal direction). (See, for example, FIGS. 3 and 6).

As discussed above, the vehicle lighting unit 10 according to the present exemplary embodiment can be configured to be capable of improving the design freedom (such as that for forming high-beam light distribution patterns P2L and P2R) and to allow an observer to visually recognize the employed projection lens 16 even including a plurality of lens portions 12, and 14L and 14R (including a plurality of rear-side focal points $F_{12}$, and $F_{14L}$ and $F_{14R}$) as a single lens with high aesthetic feature.

Modifications of the disclosed embodiment will now be described.

Although the present exemplary embodiment is configured as the vehicle lighting unit 10 including three optical units or the center optical unit 18 and the left and right optical units 20L and 20R, the presently disclosed subject matter is not limited to this configuration. For example, a vehicle lighting unit made in accordance with the principles of the presently disclosed subject matter can be composed of two optical units including the center optical unit 19 and the left optical unit 20L (or the right optical unit 20R).

Although the present exemplary embodiment is configured so that the left and right optical units 20L and 20R can form the high-beam light distribution patterns P2L and P2R, respectively, the presently disclosed subject matter is not limited to this configuration.

For example, one of or both the left and right optical units 20L and 20R can be configured to serve as a lamp for forming a fog-lamp light distribution pattern, a lamp for forming a cornering-lamp light distribution pattern, a lamp for forming a DRL (Daytime Running Lamp) light distribution pattern, a lamp for forming a position-lamp light distribution pattern, or the like. This can be achieved by adjusting the shape of the reflecting surface, the shape of the rear lens surface of the lens portion, the applied constant current, and the like.

Although the above exemplary embodiment has been described as to have the same (symmetrically same) optical units as the left and right optical units 20L and 20R, the presently disclosed subject matter is not limited to this. The left and right optical units 20L and 20R can be configured to be different from each other.

For example, the left optical unit 20L can be configured to serve as a lamp for forming a high-beam light distribution pattern while the right optical unit 20R can be configured to serve as any of the lamps described above (for example, a lamp for forming a DRL light distribution pattern). Alternatively, the left optical unit 20L can be configured to serve as any of the lamps described above (for example, a lamp for forming a fog-lamp light distribution pattern), while the right optical unit 20R can be configured to serve any of the lamps described above (for example, a lamp for forming a DRL light distribution pattern).

A description will be given of another vehicle lighting unit 10A of a second exemplary embodiment with reference to the accompanying drawings.

Figure 8:
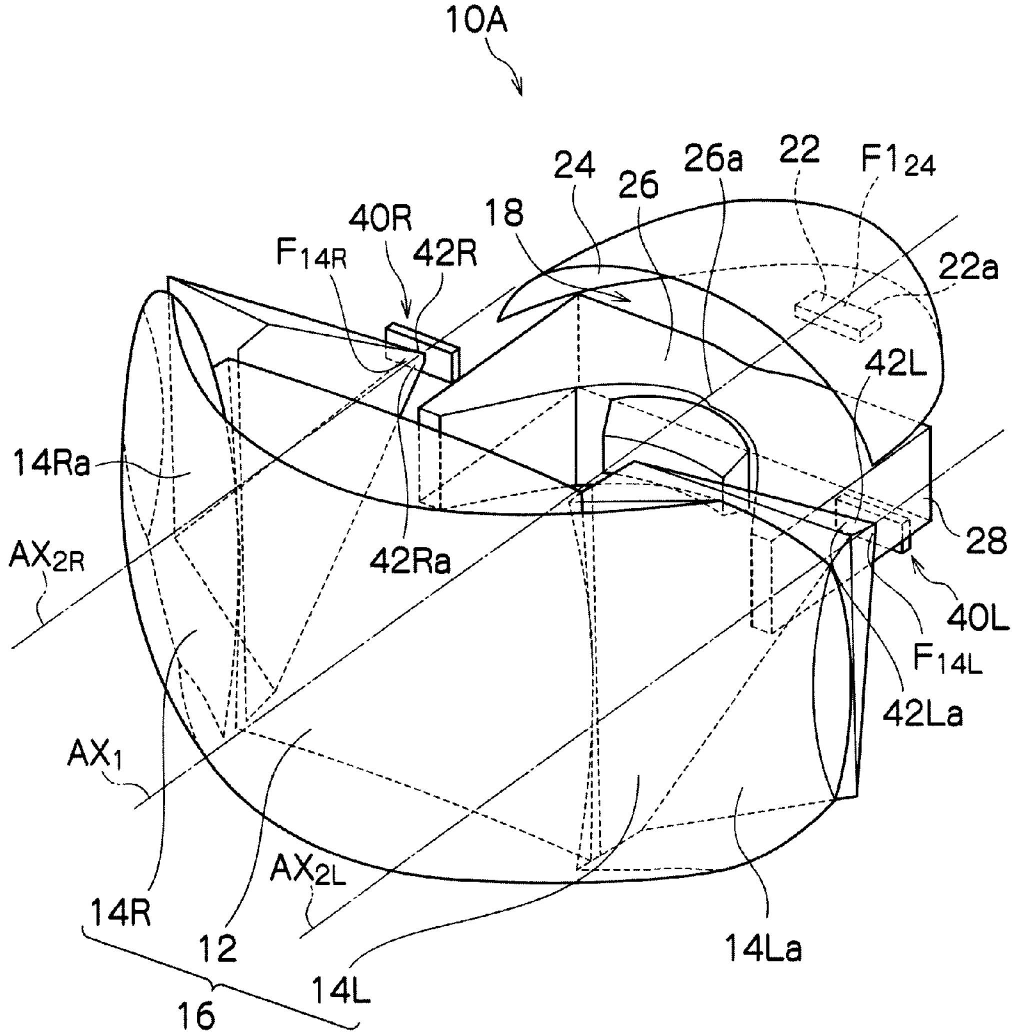
FIG. 8 is a perspective view of a vehicle lighting unit according to a second exemplary embodiment made in accordance with the principles of the presently disclosed subject matter.

FIG. 8 is a perspective view of the vehicle lighting unit 10A according to the second exemplary embodiment made in accordance with the principles of the presently disclosed subject matter.

When compared with the vehicle lighting unit 10 of the first exemplary embodiment, the vehicle lighting unit 10A of the present exemplary embodiment is different in having a direct projection type optical unit as a left optical unit 40L and a right optical unit 40R in place of the left and right optical units 20L and 20R of the projector type. Herein, the direct projection type optical unit can be an optical unit that may not include the reflecting surfaces 32L and 32R, which are used in the vehicle lighting unit 10 of the first exemplary embodiment, and can be configured to directly project light from the light source. The other components and features are the same as those of the vehicle lighting unit 10 of the first exemplary embodiment. Therefore, the different points from the vehicle lighting unit 10 of the first exemplary embodiment will be described mainly, and the same components as the vehicle lighting unit 10 of the first exemplary embodiment are denoted by the same reference numerals and the description thereof will be omitted here.

The left optical unit 40L of the present exemplary embodiment is different from the left optical unit 20L of the first exemplary embodiment in that the left reflecting surface 32L is not used and the optical unit is configured as a direct projection type optical unit. The other components and features are the same as those of the left optical unit 20L of the first exemplary embodiment. Therefore, the different points from the left optical unit 20L of the first exemplary embodiment will be described, and the same components as the left optical unit 20L of the first exemplary embodiment are denoted by the same reference numerals and the description thereof will be omitted here.

The left optical unit 40L can be configured to be a direct projector type optical unit for forming a high-beam light distribution pattern, and to include a left semiconductor light emitting device 42L, and the like. The holding member 28 can hold the left semiconductor light emitting device 42L.

The left semiconductor light emitting device 42L can be a semiconductor light emitting device such as a light emitting diode (LED) or a laser diode (LD).

Also in the present exemplary embodiment, the left semiconductor light emitting device 42L can be formed of four white LED light sources similar to those of the center semiconductor light emitting device 22.

The left semiconductor light emitting device 42L can be disposed on top of a substrate fixed on the holding member 28 at or near the focal point $F_{14L}$ of the left lens portion 14L and on or near the left optical axis $AX_{2L}$. More specifically, the four white LED light sources of the left semiconductor light emitting device 42L can be mounted on the substrate so that the respective light emission surfaces 42La face forward (see FIG. 8), so that the respective one sides of the four white LED light sources are aligned with a horizontal line orthogonal to the left optical axis $AX_{2L}$, and so that the four white LED light sources are arranged in line in the width direction of a vehicle body (along the horizontal line) at predetermined intervals. In this manner, the four light emission surfaces 42La with 1 mm square can constitute an elongated rectangular light emission surface in the vehicle body width direction. Thus, the left optical axis $AX_{2L}$ can pass through approximately the center of the left semiconductor light emitting device 42L (or of the four white LED light sources) with respect to the vehicle body width direction.

The left optical unit 40L with the above configuration can emit light rays forward so that the light rays directly enter the left lens portion 14L and project forward. More specifically, the image of the left semiconductor light emitting device 42L can be inverted and projected forward by the action of the left lens portion 14L. The projected image can form the high-beam light distribution pattern P2L on the virtual vertical screen as shown in FIG. 7B.

As the light rays from the left semiconductor light emitting device 42L can be collimated with respect to the left optical axis $AX_{2L}$ while passing through the left lens portion 14L (see FIG. 6), the high-beam light distribution pattern P2L can become a pattern with high concentration (just like a spot light) and thereby high illuminance.

As described above, the present exemplary embodiment can be configured so that the optical units are not disposed vertically as in the conventional vehicle headlamp, but the left optical unit 40L can be disposed on the left side of the center optical unit 18. Accordingly, the light rays projected from the left optical unit 40L cannot be hindered by members like a shade of an adjacent optical unit. Therefore, the vehicle lighting unit with the above configuration is capable of improving the design freedom for forming a predetermined light distribution pattern, or the high-beam light distribution pattern P2L in the present exemplary embodiment, with the light emitted from the left optical unit 40L, meaning that the high-beam light distribution pattern P2L can have sufficient illuminance to serve as a high-beam light distribution pattern with improved far-distance visibility.

The right optical unit 40R of the present exemplary embodiment is different from the right optical unit 20R of the first exemplary embodiment in that the right reflecting surface 32R is not used and the optical unit is configured as a direct projection type optical unit. The other components and features are the same as those of the right optical unit 20R of the first exemplary embodiment. Therefore, the different points from the right optical unit 20R of the first exemplary embodiment will be described, and the same components as the right optical unit 20R of the first exemplary embodiment are denoted by the same reference numerals and the description thereof will be omitted here.

The right optical unit 40R can be configured to be a direct projector type optical unit for forming a high-beam light distribution pattern, and to include a right semiconductor light emitting device 42R, and the like. The holding member 28 can hold the right semiconductor light emitting device 42R.

The right semiconductor light emitting device 42R can be a semiconductor light emitting device such as a light emitting diode (LED) or a laser diode (LD).

Also in the present exemplary embodiment, the right semiconductor light emitting device 42R can be formed of four white LED light sources similar to those of the center semiconductor light emitting device 22.

The right semiconductor light emitting device 42R can be disposed on top of a substrate fixed on the holding member 28 at or near the focal point $F_{14R}$ of the right lens portion 14R and on or near the right optical axis $AX_{2R}$. More specifically, the four white LED light sources of the right semiconductor light emitting device 42R can be mounted on the substrate so that the respective light emission surfaces 42Ra face forward (see FIG. 8), so that the respective one sides of the four white LED light sources are aligned with a horizontal line orthogonal to the left optical axis $AX_{2R}$, and so that the four white LED light sources are arranged in line in the width direction of a vehicle body (along the horizontal line) at predetermined intervals. In this manner, the four light emission surfaces 42Ra with 1 mm square can constitute an elongated rectangular light emission surface in the vehicle body width direction. Thus, the right optical axis $AX_{2R}$ can pass through approximately the center of the right semiconductor light emitting device 42R (or of the four white LED light sources) with respect to the vehicle body width direction.

The right optical unit 40R with the above configuration can emit light rays forward so that the light rays directly enter the right lens portion 14R and project forward. More specifically, the image of the right semiconductor light emitting device 42R can be inverted and projected forward by the action of the right lens portion 14R. The projected image can form the high-beam light distribution pattern P2R on the virtual vertical screen as shown in FIG. 7B.

As the light rays from the right semiconductor light emitting device 42R can be collimated with respect to the right optical axis $AX_{2R}$ while passing through the right lens portion 14R (see FIG. 6), the high-beam light distribution pattern P2R can become a pattern with high concentration (just like spot light) and thereby high illuminance.

As described above, the present exemplary embodiment can be configured so that the optical units are not disposed vertically as in the conventional vehicle headlamp, but the right optical unit 40R can be disposed on the left side of the center optical unit 18. Accordingly, the light rays projected from the right optical unit 40R cannot be hindered by members like a shade of an adjacent optical unit. Therefore, the vehicle lighting unit with the above configuration is capable of improving the design freedom for forming a predetermined light distribution pattern, or the high-beam light distribution pattern P2R in the present exemplary embodiment, with the light emitted from the right optical unit 40R, meaning that the high-beam light distribution pattern P2R can have sufficient illuminance to serve as a high-beam light distribution pattern with improved far-distance visibility.

[Lighting Control of Vehicle Lighting Unit 10A]

A description will now be given of lighting control of the vehicle lighting unit 10A with the above configuration (including the semiconductor light emitting devices 22, and 42L and 42R).

In the present exemplary embodiment, the respective semiconductor light emitting devices 22, and 42L and 42R are assumed to be electrically connected to a not-shown controller such as an ECU, to which also electrically connected is a not-shown switching device for switching between high beam and low beam.

First, when the switching device is changed to low beam side, the controller can supply the center semiconductor light emitting device 22 with a constant current to turn on the center semiconductor light emitting device 22. Upon turning on the center semiconductor light emitting device 22, the low-beam light distribution pattern P1 shown in FIG. 7A can be formed on a road as observed on the virtual vertical screen.

When the switching device is changed to high beam side, the controller can supply the left and right semiconductor light emitting devices 42L and 42R in addition to the center semiconductor light emitting device 22 with a constant current to turn on all the semiconductor light emitting devices 22, and 42L and 42R. Upon turning on all the semiconductor light emitting devices 22, and 42L and 42R, the high-beam synthesized pattern generated by overlaying the low-beam light distribution pattern P1 shown in FIG. 7A on the high-beam light distribution patterns P2L and P2R shown in FIG. 7B can be formed on a road as observed on the virtual vertical screen.

As described above, the present exemplary embodiment can be configured so that the optical units are not disposed vertically as in the conventional vehicle headlamp, but the left and right optical units 40L and 40R can be disposed on the left and right sides of the center optical unit 18, respectively. Accordingly, the light rays projected from the left and right optical units 40L and 40R cannot be hindered by some members like a shade of an adjacent optical unit. Therefore, the vehicle lighting unit 10A with the above configuration is capable of improving the design freedom for forming predetermined light distribution patterns, or the high-beam light distribution patterns P2L and P2R, with the light emitted from the left and right optical units 40L and 40R, meaning that the high-beam light distribution patterns P2L and P2R can have sufficient illuminance to serve as a high-beam light distribution pattern with improved far-distance visibility.

Furthermore, the front surface 16*a* of the projection lens 16 is not formed as a discontinuous lens surface with a step like that described in Japanese Patent Application Laid-Open No. 2005-108554, but can be formed as a single convex lens surface including the center front lens surface 12*a* of the center lens portion 12 and the respective left and right lens surfaces 14La and 14Ra of the left and right lens portions 14L and 14R and being smoothly continuous without any step. Therefore, the outer appearance of the single convex lens surface, or the front surface 16*a* of the projection lens 16, can allow the projection lens 16 to be visually observed as a single convex lens although the projection lens 16 is configured to include the plurality of lens portions 12, 14L and 14R (meaning that the lens can include a plurality of rear-side focal points $F_{12}$, $F_{14L}$, and $F_{14R}$ arranged in the horizontal direction) (See, for example, FIGS. 3 and 6).

As discussed above, the vehicle lighting unit 10A according to the present exemplary embodiment can be configured to be capable of improving the design freedom (such as that for forming high-beam light distribution patterns P2L and P2R) and to allow an observer to visually recognize the employed projection lens 16 even including a plurality of lens portions 12, and 14L and 14R (including a plurality of rear-side focal points $F_{12}$, and $F_{14L}$ and $F_{14R}$) as a single lens with high aesthetic feature.

Modifications of the disclosed embodiment will now be described.

Although the present exemplary embodiment is configured as the vehicle lighting unit 10A including three optical units or the center optical unit 18 and the left and right optical units 40L and 40R, the presently disclosed subject matter is not limited to this configuration. For example, a vehicle lighting unit made in accordance with the principles of the presently disclosed subject matter can be composed of two optical units including the center optical unit 19 and the left optical unit 20L (or the right optical unit 20R).

Although the present exemplary embodiment is configured so that the left and right optical units 40L and 40R can form the high-beam light distribution patterns P2L and P2R, respectively, the presently disclosed subject matter is not limited to this configuration.

For example, one of or both the left and right optical units 40L and 40R can be configured to serve as a lamp for forming a fog-lamp light distribution pattern, a lamp for forming a cornering-lamp light distribution pattern, a lamp for forming a DRL (Daytime Running Lamp) light distribution pattern, a lamp for forming a position-lamp light distribution pattern, or the like. This can be achieved by adjusting the shape of the rear lens surface of the lens portion, the applied constant current, and the like.

Although the above exemplary embodiment has been described as to have the same (symmetrically same) optical units as the left and right optical units 40L and 40R, the presently disclosed subject matter is not limited to this. The left and right optical units 40L and 40R can be configured to be different from each other.

For example, the left optical unit 40L can be configured to serve as a lamp for forming a high-beam light distribution pattern while the right optical unit 40R can be configured to serve as any of the lamps described above (for example, a lamp for forming a DRL light distribution pattern). Alternatively, the left optical unit 40L can be configured to serve as any of the lamps described above (for example, a lamp for forming a fog-lamp light distribution pattern), while the right optical unit 40R can be configured to serve any of the lamps described above (for example, a lamp for forming a DRL light distribution pattern).

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit having at least a first optical axis and a second optical axis extending in a front-to-rear direction of a vehicle body, the vehicle lighting unit comprising:

a projection lens including a first lens portion disposed on the first optical axis and having a first front lens surface and a first rear lens surface, and a rear-side focal point, and a second lens portion disposed on at least one of a right side and a left side of the first lens portion and on the second optical axis and having a second front lens surface and a second rear lens surface, and a rear-side focal point;

a first optical unit disposed behind the first lens portion; and a second optical unit disposed behind the second lens portion, wherein the first front lens surface and the second front lens surface are formed as a single continuous convex lens surface without any step, the first optical unit includes, a first light source disposed behind the rear-side focal point of the first lens portion and substantially at the first optical axis and configured to emit light upward during operation, a first reflecting surface configured to reflect light emitted upward from the first light source so as to converge the reflected light substantially at the rear-side focal point of the first lens portion and to cause the light to pass through the first lens portion, thereby forming a low-beam light distribution pattern of projected light in an illumination direction, and a first shade disposed substantially at the rear-focal point of the first lens portion, and the second optical unit is configured to provide light passing through the second lens portion to form a prescribed light distribution pattern in the illumination direction.

2. The vehicle lighting unit according to claim 1, wherein the second optical unit includes a second light source disposed behind the rear-side focal point of the second lens portion and substantially at the second optical axis and configured to emit light downward; and a second reflecting surface configured to reflect light emitted downward from the second light source so as to converge the reflected light substantially at the rear-side focal point of the second lens portion and to cause the light to pass through the second lens portion, thereby forming the prescribed light distribution pattern of projected light in the illumination direction.

3. The vehicle lighting unit according to claim 1, wherein the second optical unit includes a third light source disposed behind the rear-side focal point of the second lens portion and is configured to emit light that passes through the second lens portion, thereby forming the prescribed light distribution pattern of projected light in the illumination direction.

4. The vehicle lighting unit according to claim 2, wherein the predetermined light distribution pattern is a high-beam light distribution pattern.

5. The vehicle lighting unit according to claim 3, wherein the predetermined light distribution pattern is a high-beam light distribution pattern.

6. The vehicle lighting unit according to claim 1, wherein the first rear lens surface and the second rear lens surface include at least one convex surface extending towards at least one of the first optical unit and the second optical unit.

7. The vehicle lighting unit according to claim 1, further comprising a step portion located between the first rear lens surface and the second rear lens surface.

8. The vehicle lighting unit according to claim 1, wherein the first light source is a light emitting diode.

9. The vehicle lighting unit according to claim 1, wherein the first light source is a laser diode.

10. A vehicle lighting unit having at least a center optical axis, a left optical axis, and a right optical axis extending in a front-to-rear direction of a vehicle body, the vehicle lighting unit comprising:

a projection lens including a center lens portion disposed on the center optical axis and having a center front lens surface and a center rear lens surface, and a rear-side focal point, a left lens portion disposed on a left side of the center lens portion and on the left optical axis and having a left front lens surface and a left rear lens surface, and a rear-side focal point, and a right lens portion disposed on a right side of the center lens portion and on the right optical axis and having a right front lens surface and a right rear lens surface, and a rear-side focal point;

a center optical unit disposed behind the center lens portion;

a left optical unit disposed behind the left lens portion; and a right optical unit disposed behind the right lens portion, wherein the center front lens surface, the left front lens surface, and the right front lens surface are formed as a single continuous convex lens surface without any step, the center optical unit includes, a center light source disposed behind the center rear-side focal point of the center lens portion and substantially at the center optical axis and configured to emit light upward, a center reflecting surface configured to reflect light emitted upward from the center light source so as to converge the reflected light substantially at the center rear-side focal point of the center lens portion and to cause the light to pass through the center lens portion, thereby forming a low-beam light distribution pattern of projected light in an illumination direction, and a center shade disposed substantially at the center rear-focal point of the center lens portion, the left optical unit is configured to provide light that passes through the left lens portion to form a first prescribed light distribution pattern in the illumination direction, and the right optical unit is configured to provide light that passes through the right lens portion to form a second prescribed light distribution pattern in the illumination direction.

11. The vehicle lighting unit according to claim 10, wherein, the left optical unit includes:

a left light source disposed behind the rear-side focal point of the left lens portion and substantially at the left optical axis and configured to emit light downward; and a left reflecting surface configured to reflect light emitted downward from the left light source so as to converge the reflected light substantially at the rear-side focal point of the left lens portion and to cause the light to pass through the left lens portion, thereby forming the first prescribed light distribution pattern of projected light in the illumination direction; and the right optical unit includes:

a right light source disposed behind the rear-side focal point of the right lens portion and substantially at the right optical axis and configured to emit light downward; and a right reflecting surface configured to reflect light emitted downward from the right light source so as to converge the reflected light substantially at the rear-side focal point of the right lens portion and to cause the light to pass through the right lens portion, thereby forming the second prescribed light distribution pattern of projected light in the illumination direction.

12. The vehicle lighting unit according to claim 10, wherein the left optical unit includes a left light source disposed behind the rear-side focal point of the left lens portion and is configured to emit light that passes through the left lens portion, thereby forming the first prescribed light distribution pattern of projected light in the illumination direction, and the right optical unit includes a right light source disposed behind the rear-side focal point of the right lens portion and is configured to emit light that passes through the right lens portion, thereby forming the second prescribed light distribution pattern of projected light in the illumination direction.

13. The vehicle lighting unit according to claim 11, wherein the first and second predetermined light distribution patterns are each a high-beam light distribution pattern.

14. The vehicle lighting unit according to claim 12, wherein the first and second predetermined light distribution patterns are each a high-beam light distribution pattern.

15. The vehicle lighting unit according to claim 10, wherein the center rear lens surface, the right rear lens surface, and the left rear lens surface include at least one convex surface extending towards at least one of the center optical unit, the right optical unit, and the left optical unit, respectively.

16. The vehicle lighting unit according to claim 10, further comprising a step portion located between the right rear lens surface and the center rear lens surface.

17. The vehicle lighting unit according to claim 10, wherein the center light source is a light emitting diode.

18. The vehicle lighting unit according to claim 10, wherein the center light source is a laser diode.

* * * * *